(12) United States Patent
Park et al.

(10) Patent No.: US 7,908,633 B2
(45) Date of Patent: Mar. 15, 2011

(54) PMCP EXTENSION METADATA, DATA STREAM GENERATING DEVICE, DIGITAL DATA BROADCASTING EMISSION SYSTEM AND DIGITAL DATA BROADCASTING EMISSION METHOD THEREOF

(75) Inventors: Min-Sik Park, Daejeon (KR); Ji-Hoon Choi, Daejeon (KR); Yong-Ho Kim, Daejeon (KR); Yong-Ju Lee, Daejeon (KR); Jin-Soo Choi, Daejeon (KR); Jin-Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 750 days.

(21) Appl. No.: 11/577,898

(22) PCT Filed: May 30, 2005

(86) PCT No.: PCT/KR2005/001606
§ 371 (c)(1),
(2), (4) Date: Apr. 25, 2007

(87) PCT Pub. No.: WO2006/046797
PCT Pub. Date: May 4, 2006

(65) Prior Publication Data
US 2009/0133062 A1    May 21, 2009

(30) Foreign Application Priority Data

Oct. 25, 2004   (KR) ........................ 10-2004-0085498

(51) Int. Cl.
*H04N 7/173*   (2006.01)
(52) U.S. Cl. .......................................... 725/116; 725/54

(58) Field of Classification Search .................... 725/39, 725/54, 116, 114, 138, 144–146
See application file for complete search history.

(56) References Cited

U.S. PATENT DOCUMENTS 6,708,338 B1 *   3/2004   Kim ............................... 725/135
(Continued)

FOREIGN PATENT DOCUMENTS

KR     1020020001828 A     1/2002
(Continued)

OTHER PUBLICATIONS

New ACAP Standard vol. Four, Issue Three, Oct. 2003 ("ACAP Standard").*

(Continued)

*Primary Examiner* — Andrew Y Koenig
*Assistant Examiner* — Aklil Tesfaye
(74) *Attorney, Agent, or Firm* — Ladas & Parry LLP

(57) ABSTRACT

Provided are a data server, which is added to a digital broadcast emitting system to emit data broadcasting based on the Programming Metadata Communication Protocol (PMCP), a conventional international specification defined to secure inter-operability between devices of a digital broadcast emitting system; a metadata structure for securing inter-operability between devices of the conventional digital broadcast emitting system; a data stream generating device using the metadata structure; and a digital data broadcast emitting system and method thereof. The PMCP extended metadata of the present invention are formed to include channel type metadata which provide system information of a data event constituting a data broadcast program; and Program and System Information Protocol (PSIP) data event metadata which provide identification information, program guide, and encapsulation information of a data event.

22 Claims, 13 Drawing Sheets

U.S. PATENT DOCUMENTS

| | | | |
|---|---|---|---|
| 2002/0035726 A1* | 3/2002 | Corl | 725/39 |
| 2002/0059583 A1 | 5/2002 | Kim | |
| 2002/0128029 A1* | 9/2002 | Nishikawa et al. | 455/517 |
| 2005/0108772 A1* | 5/2005 | Crinon et al. | 725/134 |

FOREIGN PATENT DOCUMENTS

| | | |
|---|---|---|
| KR | 1020040026388 A | 3/2004 |
| KR | 1020040081390 A | 9/2004 |

OTHER PUBLICATIONS

New Candidate Standard Makes Quick and Easy Connections PMCP Standard vol. Four, Issue Four, Dec. 2003 ("PMCP Standard").*

ATSC Standard: Programming Metadata Communication Protocol, Revision B, Document A/76B, Jan. 14, 2008.*

Park, M., et al., "PMCP Schema Extended for Data Broadcasting." Nov. 29, 2004. ATSC TSG/S1 Specialist Group on PSIP Metadata Communication.

Park, Y.K., et al., "Implementation of PSIP Generating System for Data Broadcasting Based on PMCP." Feb. 2005. *The 7th International Conference on Advanced Communication Technology*, ICACT 2005, vol. 2, pp. 1175-1179.

Choi, J.H., et al., "Design of PSIP converter for data broadcasting service in interoperable network of terrestrial and cable." Nov. 2004. *Intelligent signal Processessing and Communication Systems*, pp. 604-608.

"ATSC Standard: Programming Metadata Communication Protocol, Revision A." Sep. 2006. *Advanced Television Systems Committee, Inc., Document A/76A*, pp. 1-51.

* cited by examiner

FIG. 11

```xml
<?xml version="1.0" encoding="UTF-8"?>
<!--Sample PMCP file for Damo, Two Directory -->
<PmcpMessage id="100004" origin="Streaming_Controller" originType="Traffic" dateTime="2004-12-14T04:28:00+09:00" destination="ACAP_Data_Server" type="information">
  <Channel channelNumber="11-1" tsid="101" programNumber="1" sourceID="1" pmtPID="72" pcrPid="48" cation="add">
    <ElementaryStream pid="210" type="11">
      <Carousld carouselId="1" moduleVersion="0" moduleId="0" blockSize="4508" objectKey="0"/>
      <AssociationTag associationTag="1" use="0" transactionId="2147483648" timeout="10000000"/>
    </ElementaryStream>
    <ElementaryStream pid="220" type="5">
      <ApplicationSignaling>
        <VersionInfo applicationType="6" atiVersionNumber="1"/>
      </ApplicationSignaling>
    </ElementaryStream>
    <ElementaryStream pid="48" type="2"/>
    <ElementaryStream pid="49" type="129" audioid="1"/>
  </Channel>
  <PsipDataEvent startTime="2004-12-14T04:30:00+09:00" duration="PT50M" action="add">
    <DataEventId channelNumber="11-1">
      <PsipDataId dataId="101"/>
    </DataEventId>
    <DataStream>
      <ApplicationInformationTable applicationType="6" pid="220">
        <!-- applicationType="6" for ACAP-J -->
        <TransportProtocol transportProtocolLabel="1" protocolId="6" sourceId="1" componentTag="1"/>
        <!-- protocolId="6" for ACAP ObjectCarousel -->
        <DiiLocation transportProtocolLabel="1">
          <DiiModule diiIdentification="1" associationTag="1"/>
        </DiiLocation>
        <Application organizitionId="1" applicationId="1" controlCode="1">
          <ApplicationInfo applicationProfile="1" versionMajor="1" versionMinor="0" versionMicro="0" serviceBoundFlag="1" visibility="1" applicationPriority="1" transportProtoclLabel="1"/>
          <ApplicationName land="kor" applicationName="quiz"/>
          <Application parameter="quiz"/>
          <ApplicationLocation baseDirectory="/" classPathExtension="" initialClass="XletMain"/>
        </Application>
      </ApplicationInformationTable>
      <ObjectCarousel>
        <DataCarousel carouselId="1" blockSize="4058" periodMs="1000">
          <DsiMessage associationTag="1" transactionId="2147483648" periodMs="500"/>
          +<DiiMessage associationTag="1" transactionId="2147483650" periodMs="500">
          <PidInfo associationTag="1" pid="210"/>
        </DataCarousel>
        +<ServiceGateway carouselId="1" sourceId="1" moduleId="0" objectKey="0">
      </ObjectCarousel>
    </DataStream>
  </PsipDataEvent>
</PmcpMessage>
```

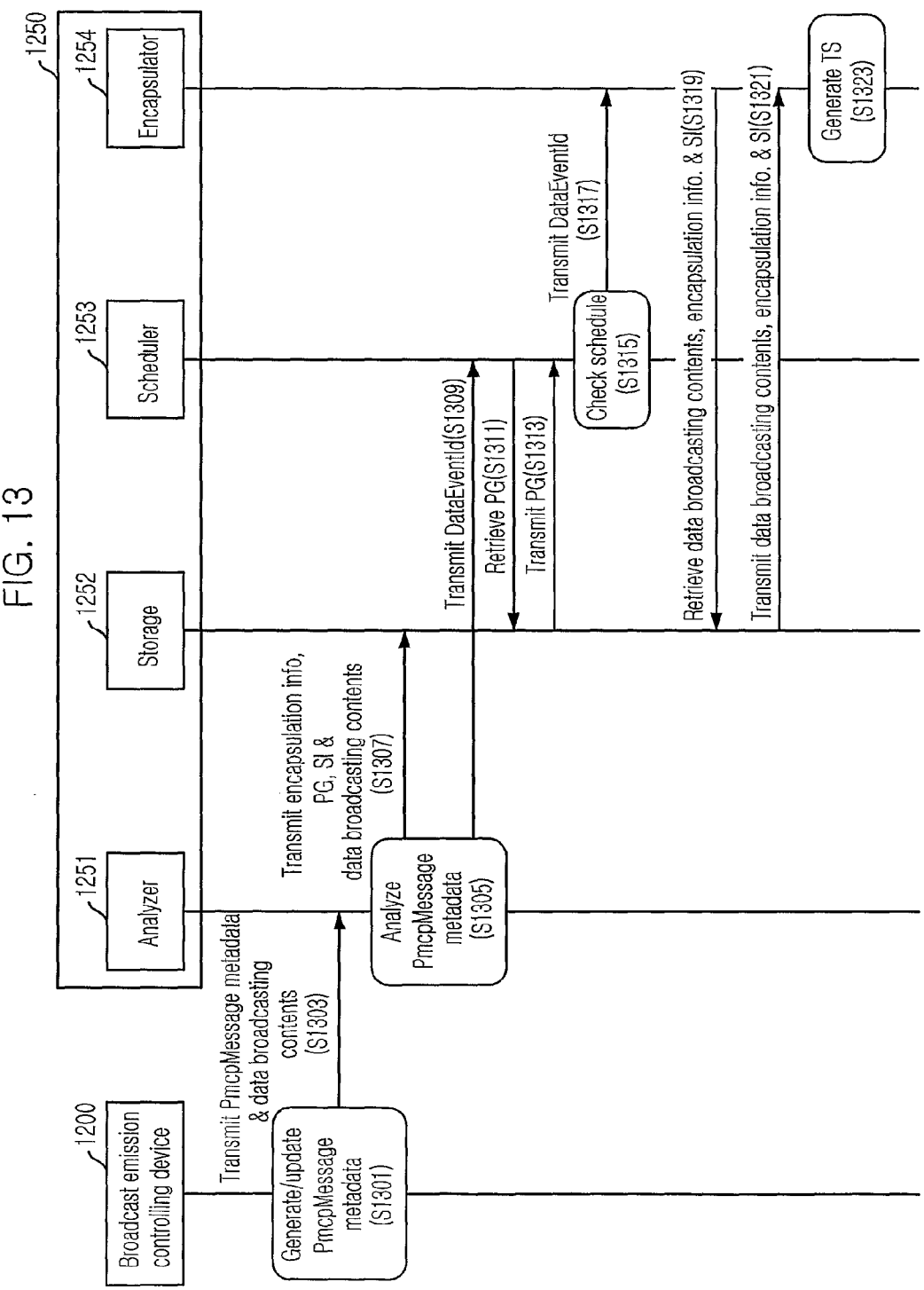

PMCP EXTENSION METADATA, DATA STREAM GENERATING DEVICE, DIGITAL DATA BROADCASTING EMISSION SYSTEM AND DIGITAL DATA BROADCASTING EMISSION METHOD THEREOF

TECHNICAL FIELD

The present invention relates to metadata for securing inter-operability among devices composing a digital data broadcast emitting system, a data stream generating device using the metadata, a digital data broadcast emitting system and method thereof.

In particular, the present invention relates to a metadata structure for securing inter-operability between a data server, a device which is added to a digital broadcast emitting system to emit a data broadcast, and conventional devices of the digital broadcast emitting system based on a Programming Metadata Communication Protocol (PMCP), which is a conventional international specification defined to secure the inter-operability between components of the digital broadcast emitting system; a data stream generating device using the metadata structure; a digital data broadcast emitting system using the data stream generating device; and a digital data broadcast emitting method thereof.

BACKGROUND ART

As the type of broadcasting changes from analog to digital, there is an increasing demand for transmitting System Information (SI) and Program Guide (PG) of a broadcast program to a receiver through a broadcasting channel in a digital broadcast emitting system.

For this, the Advanced Television Systems Committee (ATSC) defines the Program and System Information Protocol (PSIP), a standard specification for transmitting system information and program guide of a broadcast program in a form of transport stream (TS) based on the Moving Picture Experts Group (MPEG)-2 System specifications.

The ATSC names a broadcast emitting device transmitting the system information and program guide of a broadcast program in the form of transport stream based on the PSIP as a PSIP server or a PSIP generator. The PSIP information is primarily authored by a program manager of a broadcasting station through a program management system and transmitted to the PSIP server. The primarily authored PSIP information can be updated, deleted or have additional information upon a change in a broadcasting schedule before final broadcasting.

The change in the broadcasting schedule occurs in a broadcast emission controlling device such as a traffic system, an automation system, and an MPEG controller. The broadcast emission controlling device should inform the PSIP server of changed program guide so that the PSIP server can update the PSIP information.

However, interface independently defined by each operator to exchange changed broadcast program guide cannot secure inter-operability between digital broadcast emitting systems developed by various companies, i.e., broadcast emission controlling devices, and the PSIP server. This calls for more efforts and costs for realizing an interface between broadcasting devices on the parts of an operator of a digital broadcast emitting system and hardware developers when a broadcast emitting system is built up.

In order to resolve the problems, the ATSC defines a metadata structure and a metadata transmitting method in an ATSC A/76 Standard called Programming Metadata Communication Protocol (PMCP) to exchange standardized PSIP information between constitutional devices of the digital broadcast emitting system.

FIG. 1 is a structure of metadata defined in the PMCP specification. As shown in FIG. 1, a PmcpMessage metadata 100 includes message state metadata 110, i.e., PmcpReply metadata; transport stream (TS) metadata 120, i.e., TransportStream metadata; channel metadata 130; show metadata 140; PSIP event metadata 150, i.e., PsipEvent metadata; time parameters metadata 160, i.e., TimeParameters metadata; rating metadata 170, i.e., Ratings metadata; and user definition metadata 180, i.e., PrivatePmcpInformation metadata. The PmcpReply metadata 110 describes validity and process status of transport stream. The TransportStream metadata 120 described information of transport stream. The Channel metadata 130 describes virtual channel information and channel tuning information. The Show metadata 140 describes a play list of a show used for broadcast program guide. The PsipEvent metadata 150 describes the broadcast program guide. The TimeParameters metadata 160 describes system time information. The Ratings metadata 170 describes a rating of a broadcast program. The PrivatePmcpInformation metadata 180 describes PMCP user definition information of a system level.

The PmcpMessage metadata 100 describes information needed for the PSIP server to generate PSIP/program specific information (PSI) in a form of transport stream. That is, the PMCP specification only considers the providing of metadata needed for the broadcast emitting system to transmit the PSIP and PSI, which are system information and program guide of an audio/video broadcast program, i.e., a broadcast program formed of audio, video or both audio and video, in a digital broadcasting environment.

However, the broadcasting environment takes its own course from a conventional digital broadcasting environment where viewers simply watch audio/video only to a digital data broadcasting environment where the viewers can receiver diverse services by receiving broadcast programs along with data.

In order to provide data broadcasting, a broadcast emitting device for encapsulating data broadcasting contents based on a data broadcasting specification and outputting the encapsulated data broadcasting contents in the form of MPEG-2 transport stream should be added to a conventional digital broadcast emitting system. The broadcast emitting device is generally called a data server or a data stream generator.

A data server should be able to receive program guide and encapsulation information to generate data stream just as a PSIP server for a digital service and change the program guide and encapsulation information in a broadcast emitting controlling device such as a traffic system, an automation system, an MPEG controller.

However, since the conventional PMCP does not describe encapsulation information and program guide for data broadcasting, it is not appropriate as an interface of a broadcast emitting system with secure inter-operability for data broadcast emission. Therefore, a technological solution which is added to a broadcast emitting system and securing the inter-operability between broadcasting devices is required to transmit digital data broadcasting.

DISCLOSURE

Technical Problem

It is, therefore, an object of the present invention to provide a Programming Metadata Communication Protocol (PMCP)

extended metadata structure, a structure obtained by extending conventional PMCP metadata, to secure inter-operability between devices of a conventional digital broadcast emitting system and a data server, which is an additional device to the digital broadcast emitting system, to transmit data broadcasting; a data stream generating device using the PMCP extended metadata structure; a digital data broadcast emitting system; and a digital data broadcast emitting method thereof.

Technical Solution

In accordance with one aspect of the present invention, there is provided a data stream generating device, which includes: an analyzer for analyzing Programming Metadata Communication Protocol (PMCP) extended metadata transmitted from a broadcast emission controlling device and storing system information, program guide, and encapsulation information of a data event along with a data broadcasting content in a storage; a scheduler for acquiring the program guide of the data event from the storage and checking time when a data broadcasting content of the data event is supposed to be outputted based on the acquired program guide; and an encapsulator for acquiring and outputting the data broadcasting content to be outputted from the storage, the encapsulation information, and the system information to a user terminal in a form of transport stream.

The PMCP extended metadata, which is suggested in the present invention, are formed to include channel type metadata which provide system information of a data event constituting a data broadcast program, and Program and System Information Protocol (PSIP) data event metadata which provide identification (ID) information, program guide and encapsulation information of a data event, and descriptor information of a Data Event Table (DET). The PSIP data event ID metadata include data event ID metadata which provide ID information of the data event, DET descriptor metadata which describe descriptor information of a DET, and data stream metadata which provide the PSIP data event metadata, and the PSIP data event metadata have the program guide as an attribute. The PSIP data event metadata further include content ID metadata which describe ID information of a content constituting a data event, show data metadata which describe show information constituting a data event, DET private metadata for individually defining and using what needs to be registered other than predetermined schema in connection with the DET, and private metadata which describe information defined by a user with respect to the data event.

Herein, the analyzer acquires the program guide based on the attribute of the PSIP data event metadata, the encapsulation information based on the data stream metadata, and the system information from the channel data based on the data event ID information. Also, the scheduler acquires program guide of a data event from the storage based on the data event ID information transmitted from the analyzer. Also, the encapsulator acquires a data broadcast content to be outputted from the storage, the encapsulation information, and the system information based on the data event ID information transmitted from the scheduler.

In accordance with another aspect of the present invention, there is provided PMCP extended metadata which include: channel type metadata which provide system information of a data event constituting a data broadcast program; and PSIP event metadata which provide ID information of an audio/video (AV) event constituting an AV broadcast program, and program guide and encapsulation information of a data event. Herein, the program guide of the data event and a program guide of the AV event are the same. Herein, the PSIP event metadata include: event ID metadata which provide ID information of the AV event; and data stream metadata which provide the encapsulation information of the data event, and the PSIP event metadata have program guide of the data event as an attribute.

Herein, the analyzer acquires the program guide based on the attribute of the PSIP event metadata, the encapsulation information based on the data stream metadata, and the system information from the channel data based on the AV event ID information. Also, the scheduler acquires program guide of a data event from the storage based on the AV event ID information transmitted from the analyzer. The encapsulator acquires a data broadcast content to be outputted from the storage, the encapsulation information, and the system information based on the AV event ID information transmitted from the scheduler.

In accordance with another aspect of the present invention, there is provided a channel type metadata which provide system information of a data event constituting a data broadcast program; PSIP data event metadata which provide descriptor information of a DET; and data stream metadata which provide ID information, program guide and encapsulation information of a data event. The data stream metadata includes data event ID metadata for providing ID information of the data event, and the program guide as an attribute.

Herein, the analyzer acquires the program guide based on the attribute of the data stream metadata, the encapsulation information based on the data stream metadata, and the system information from the channel data based on the data event ID information. Also, the scheduler acquires program guide of a data event from the storage based on the data event ID information transmitted from the analyzer. Also, the encapsulator acquires a data broadcast content to be outputted from the storage, the encapsulation information, and the system information based on the data event ID information transmitted from the scheduler.

In accordance with another aspect of the present invention, there is provided a digital data broadcast emitting system, which includes: a broadcast emission controlling device for generating and updating PMCP extended metadata having system information, program guide and encapsulation information of a data broadcast program, and controlling the output of transport stream of the data broadcast program based on the program guide; and a data stream generating device for generating and transmitting data stream based on the system information, the program guide and the encapsulation information of the data event which is described in the PMCP extended metadata transmitted form the broadcast emission controlling device.

In accordance with another aspect of the present invention, there is provided a digital data broadcast emitting method, which includes the steps of: a) analyzing PMCP extended metadata transmitted from a broadcast emission controlling device and storing system information, program guide and encapsulation information of a data event in a database along with a data broadcasting content; b) checking time when the data broadcasting content corresponding to the data event are supposed to be outputted based on the program guide of the data event acquired from the database; and c) acquiring and outputting the data broadcasting content to be outputted, the encapsulation information, and the system information from the database to a user terminal in a form of transport stream.

ADVANTAGEOUS EFFECTS

The present invention secures inter-operability between a broadcast emission controlling device and a data server by adding metadata needed to emit data broadcasting to a conventional Programming Metadata Communication Protocol (PMCP) structure and extending the PMCP metadata structure.

Also, the present invention provides an efficient control interface between the broadcast emission controlling device and the data server such as update, addition and deletion of a data event.

DESCRIPTION OF DRAWINGS

FIG. 11 is an exemplary schema of a PMCP extended message realized by using PmcpMessage metadata in accordance with a first embodiment of the present invention;

FIG. 13 is a flowchart describing a data broadcast emitting method using PmcpMessage metadata in accordance with an embodiment of the present invention.

BEST MODE FOR THE INVENTION

Other objects and aspects of the invention will become apparent from the following description of the embodiments with reference to the accompanying drawings, which is set forth hereinafter. If it is considered that detailed description on prior art related to the present invention may blur the point of the present invention, the description will not be provided. Hereinafter, a preferred embodiment of the present invention will be described with reference to the accompanying drawings.

Figure 1:
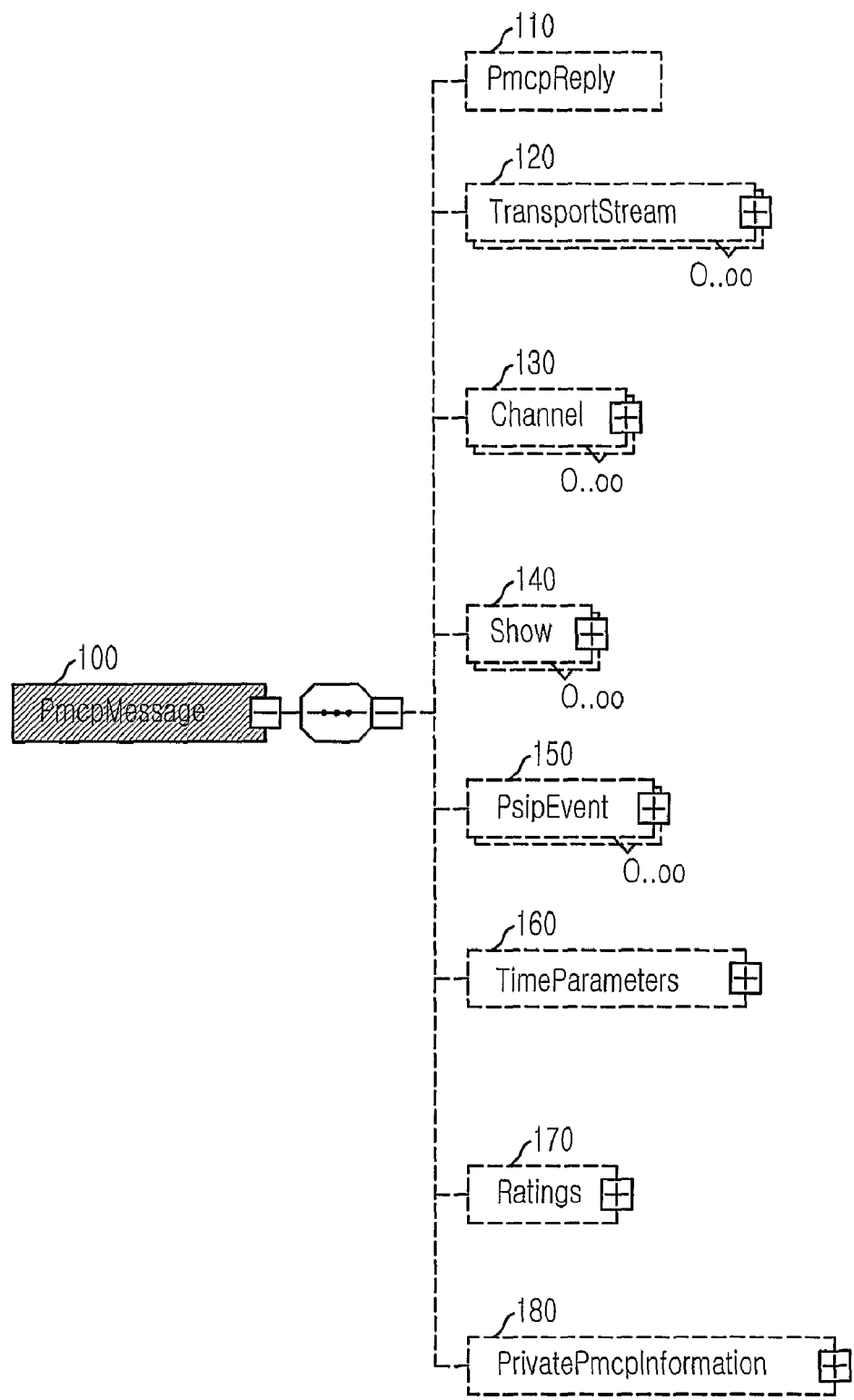
FIG. 1 is a diagram illustrating a structure of metadata defined in the Programming Metadata Communication Protocol (PMCP) specification.
Figure 2:
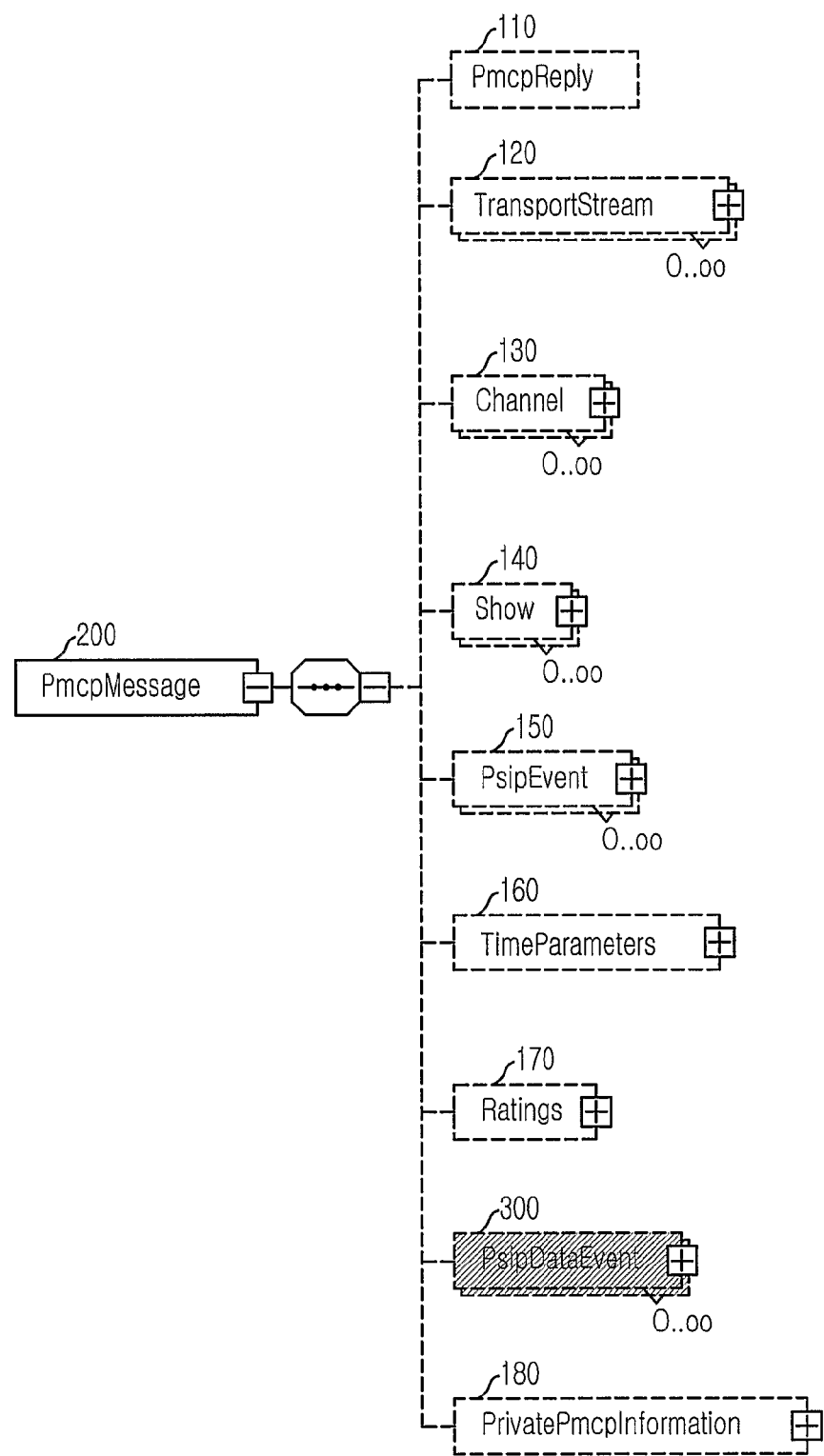
FIG. 2 is a diagram showing PmcpMessage metadata in accordance with a first embodiment of the present invention.

FIG. 2 is a diagram showing PMCP extended metadata in accordance with a first embodiment of the present invention. As shown in FIG. 2, the structure of the PMCP extended metadata 200, i.e., PmcpMessage metadata, which is suggested in the present invention, is obtained by adding PSIP data event metadata 300 to a convention PMCP metadata 100.

PmcpReply metadata 110, which are message state metadata, describe validity and process status of a transmitted message. TransportStream metadata 120, which are transport stream (TS) metadata, describe information of transport stream. Channel metadata 130 describe not only virtual channel and channel tuning information but also program map table (PMT) descriptor information. The PMT is used to signalize an application by providing information on elementary stream of a program and it is defined in an Advanced Common Application Platform (ACAP) in detail.

Show metadata 140 describes a play list of a show, which is used for audio/video (AV) broadcast program guide information. PsipEvent metadata 150, which are PSIP event metadata, describe AV broadcast program guide information. TimeParameters metadata 160, which are time metadata, describe system time information.

Ratings metadata 170 describes the rating of an AV broadcast program. PrivatePmcpInformation metadata 180, which are user definition metadata, describe PMCP user definition information of a system level.

PsipDataEvent metadata 300, which are PSIP data event metadata, include description information on identification (ID) of a data event, a contents ID, show, a data event table (DET) and data encapsulation, which form a data broadcasting. The DET includes information on a data service of a particular virtual channel and it is described in the data broadcasting standard A/90 of the ATSC (ATSC) in detail.

The PsipDataEvent metadata 300 include program guide information of a data event, such as start time and lasting time, as attributes.

Figure 3:
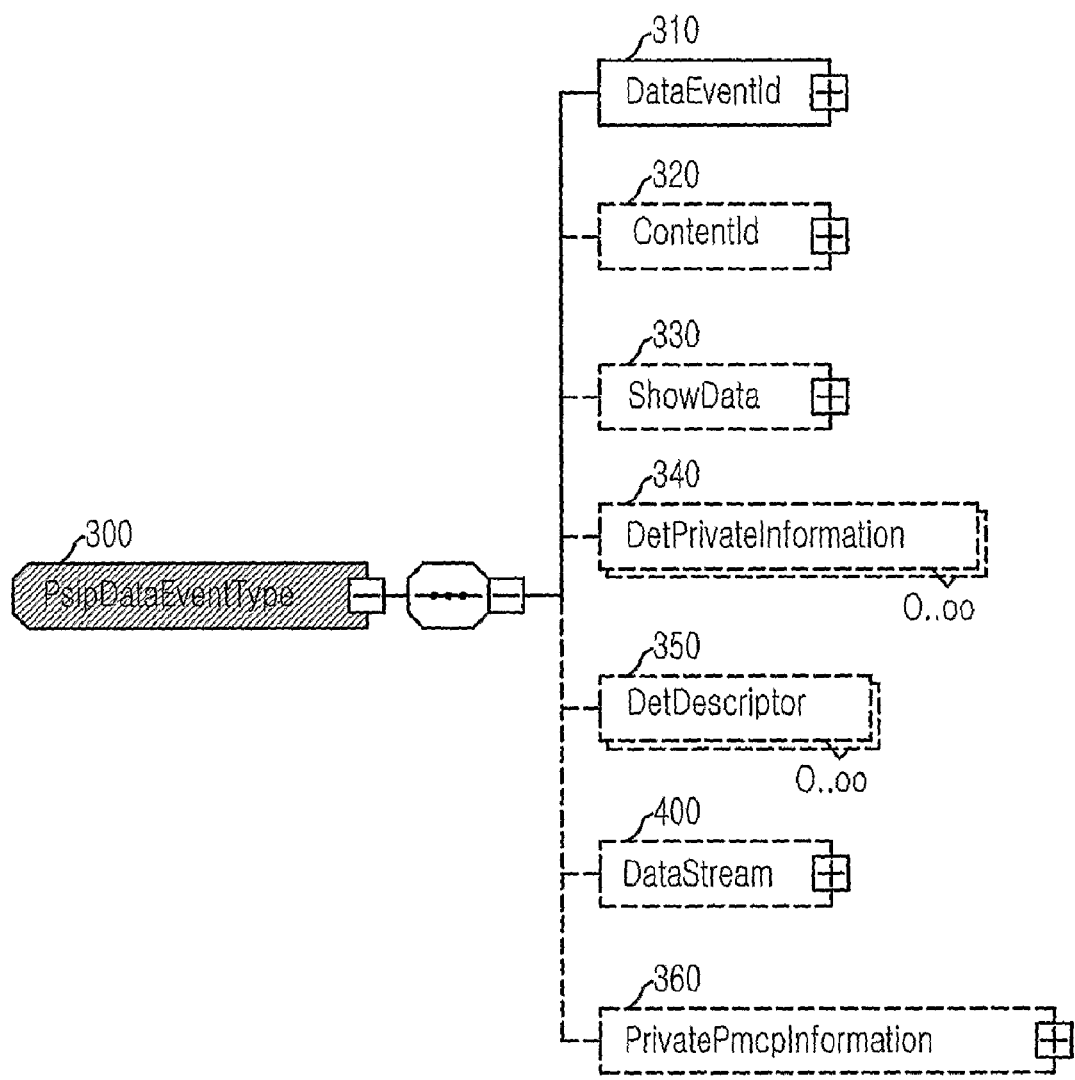
FIG. 3 is a diagram describing a structure of PSIP data event metadata of FIG. 2.

FIG. 3 is a diagram describing a structure of PsipDataEvent metadata of FIG. 2.

As shown in FIG. 3, the PsipDataEvent metadata 300 describe a data event that constitutes a data broadcasting. The PsipDataEvent metadata 300 include DataEventId metadata 310, ContentId metadata 320, ShowData metadata 330, DetPrivateInformation metadata 340, DetDescriptor metadata 350, DataStream metadata 400, and PrivatePmcpInformation metadata 360.

The DataEventId metadata 310, which describe ID information of a data event, include a transport stream identifier (TSID) additionally along with a channel number corresponding to the data event, and the DataEventId metadata 310 further include any one selected from a group of initial start time, data ID, which is a table ID included in a Data Event Table (DET), and ID information arbitrarily allocated by a producer.

The ContentId metadata 320 describe ID information of a content constituting a data event and include an International Standard Audiovisual Number (ISAN) and inherent ID information allocated by a broadcasting station to a content.

The ShowData metadata 330 describe show information constituting a data event and include such information as the title of a show, an overview of the show, and the rating of the show.

The DetPrivateInformation metadata 340 are used to define what needs to be registered other than predetermined schema individually in connection with a DET constituting a data broadcast program.

The DetDescriptor metadata 350 describe descriptor information of the DET and include a descriptor tag number and contents of the descriptor.

The DataStream metadata 400 describe encapsulation information of a data event and include transmission protocol information and signaling information of a data service.

The PrivatePmcpInformation metadata 360 describe what is defined by a user with respect to a data event.

Figure 4:
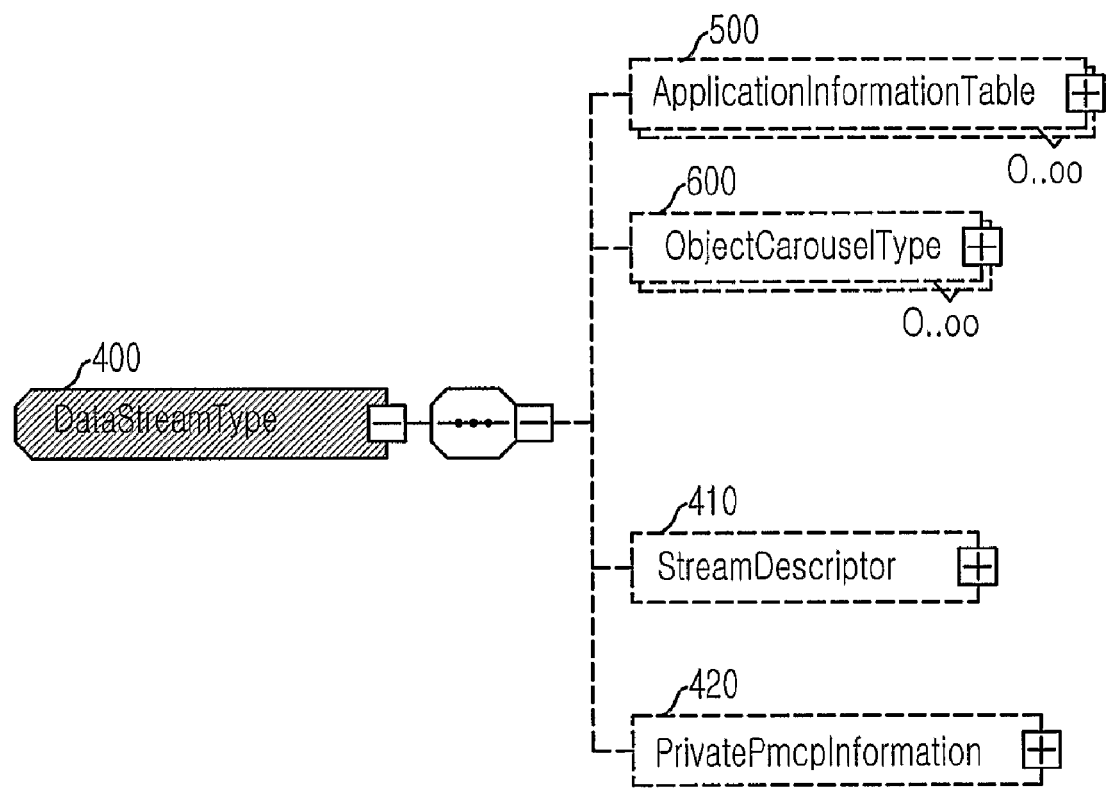
FIG. 4 is a diagram illustrating DataStreamType metadata of FIG. 3.

FIG. 4 is a diagram illustrating DataStreamType metadata of FIG. 3. The DataStream metadata 400 provide encapsulation information needed for typical data broadcasting.

As shown in FIG. 4, the DataStream metadata 400 can be formed to include ApplicationInformationTable metadata 500 describing signaling information of an application defined in an ACAP Application Information Table (AIT), ObjectCarouselType metadata 600 describing object carousel which is a protocol for transmitting an ACAP application, StreamDescriptor metadata 410 describing Digital Storage Media Command and Control (DSM-CC) stream descriptor information, and PrivatePmcpInformation 420 describing information defined by a user with respect to a data stream.

Figure 5:
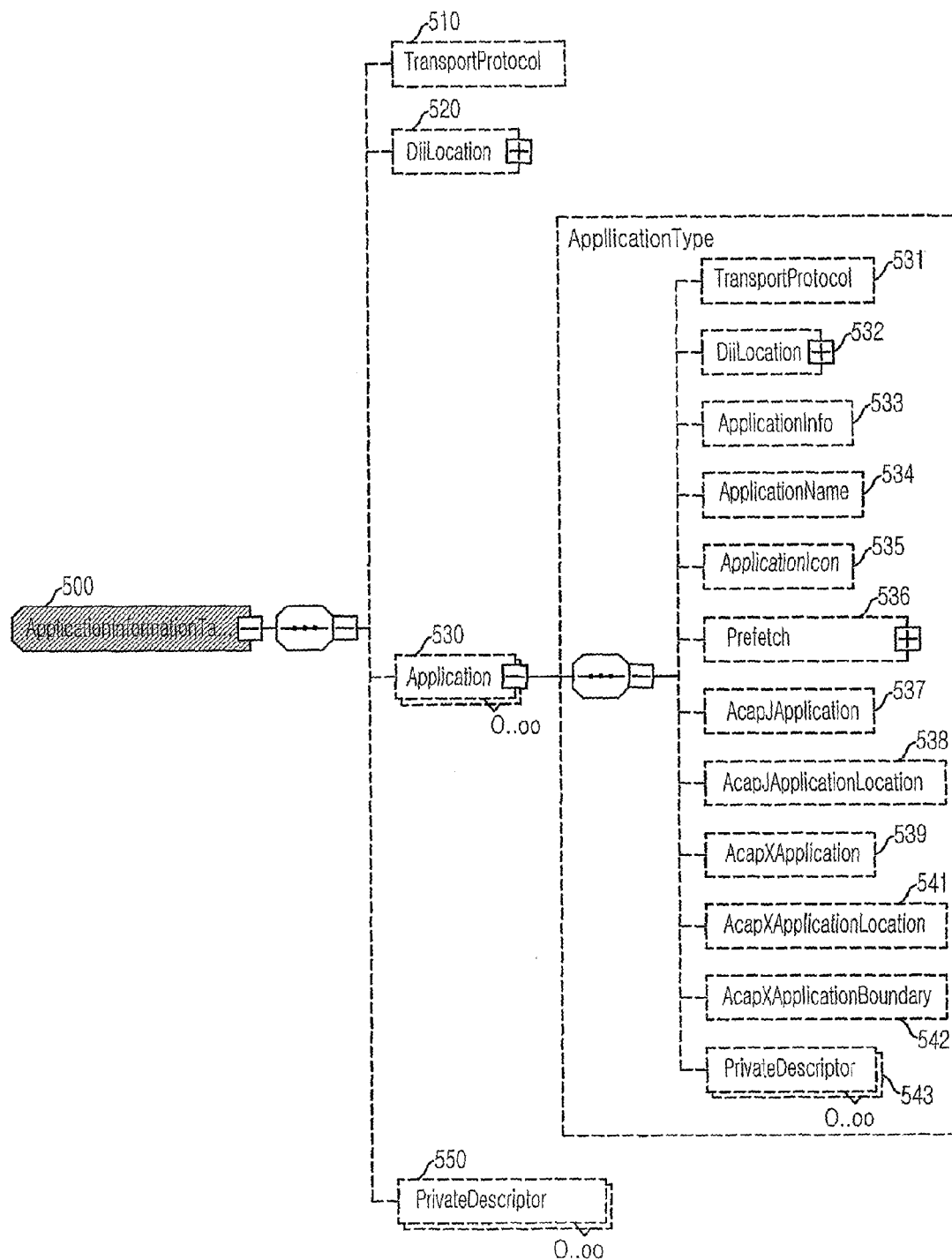
FIG. 5 is a diagram showing AIT (AIT) metadata of FIG. 4.

FIG. 5 is a diagram showing AIT (AIT) metadata of FIG. 4. The AIT is a table describing an application and related information, and the AIT is described in the ACAP in detail. The ApplicationInformationTable metadata 500 describe the AIT information. The ApplicationInformationTable metadata 500 describe an application common descriptor, which is applied in common to all ACAP data broadcasting applications described in the AIT, and an application specific descriptor, which can be applied to a specific ACAP data broadcasting application.

As shown in FIG. 5, the ApplicationInformationTable metadata 500 describing signaling information can be formed to include TransportProtocol metadata 510, DiiLocation metadata 520, Application metadata 530, PrivateDescriptor metadata 550.

The TransportProtocol metadata 510 describes an application transport protocol descriptor, which is one of application common descriptors.

The DiiLocation metadata 520 describing a Download Information Indication (DII) location descriptor, which is one of application common descriptors, describe a list of DII messages related to object carousel, which is a transport protocol of a data broadcasting application.

The Application metadata 530 describe detailed information of an application transmitted through an object carousel, which is a transport protocol of an ACAP application.

The Application metadata 530 include such attributes as an organization ID and an application ID in order to identify an application. Also, the Application metadata 530 have an attribute of a control code for controlling whether to autostart the application immediately upon arrival of the application in a receiver, whether to hold on the execution of the application and temporarily prefetch it in a cache memory, or whether to kill or terminate the application which is held back from execution and prefetched into the cache memory.

The Application metadata 530 describing an application specific descriptor can be formed to include TransportProtocol metadata 531 describing transport protocol information of a corresponding application, DiiLocation metadata 532 describing a list of DII messages related to an object carousel, ApplicationInfo metadata 533 describing general information on an application, ApplicationName 534 describing the name of an application, ApplicationIcon 535 describing information on an icon related to application, and Prefetch metadata 536 describing information on a prefetched application stored in a cache memory.

Also, the Application metadata 530 can be formed to further include AcapJApplication metadata 537 describing information on parameters needed to start an ACAP-J-based application, AcapJApplicationLocation metadata 538 describing information for describing the location of an ACAP-J-based application, AcapXApplication metadata 539 describing information on parameters needed to start an ACAP-X-based application, AcapXApplicationLocation 541 describing information for describing the location of an ACAP-X-based application, AcapXApplicationBoundary 542 describing information for describing data elements of an ACAP-X-based application, and PrivateDescriptor 543.

Figure 6:
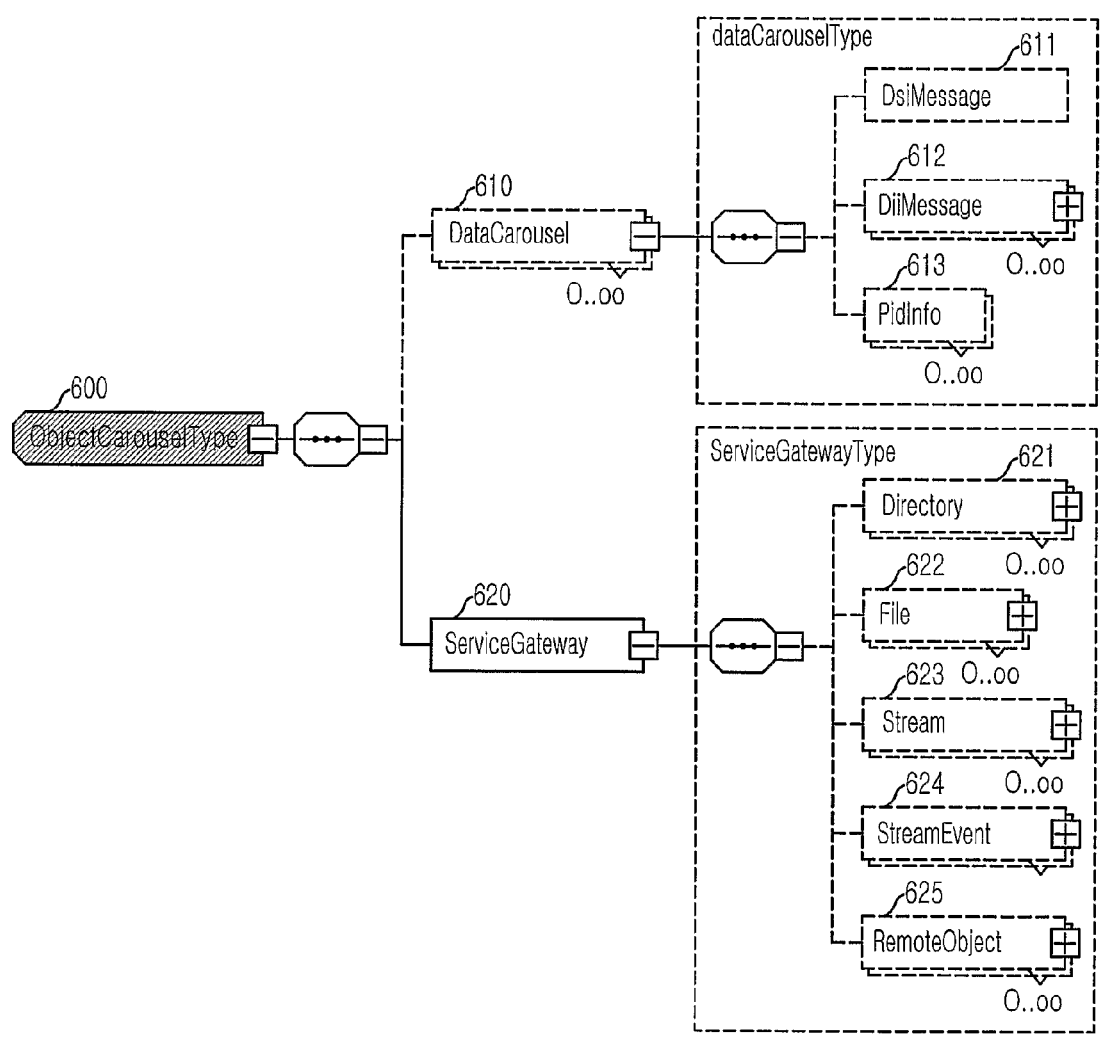
FIG. 6 is a diagram describing objectCarouselType metadata of FIG. 4.

FIG. 6 is a diagram describing ObjectCarouselType metadata. The ObjectCarouselType metadata describe encapsulation information defined in the ACAP.

As illustrated in FIG. 6, the ObjectCarouselType metadata 600 can be formed to include DataCarousel metadata 610 describing information on a data carousel transmitting an ACAP object message and ServiceGateway metadata 620 describing a service gateway of an object carousel transmitting an ACAP application.

The DataCarousel metadata 610 include DsiMessage metadata 611 describing information on a Download Server Initiate (DSI), which is one of messages of a data carousel, DiiMessage metadata 612 describing information on a Download Information Indication (DII) message, and PidInfo metadata 613 describing information on a Packet Identifier (PID) of a packet to which a data carousel message is transmitted.

The ServiceGateway metadata 620 can be formed to include Directory metadata 621 describing a directory object message among messages of an object carousel, File metadata 622 describing a file object message, Stream metadata 623 describing a stream object message, StreamEvent metadata 624 describing a stream event object message, and RemoteObject metadata 625 describing information in an object message which is transmitted not to a corresponding object carousel but to another object carousel.

Figure 7:
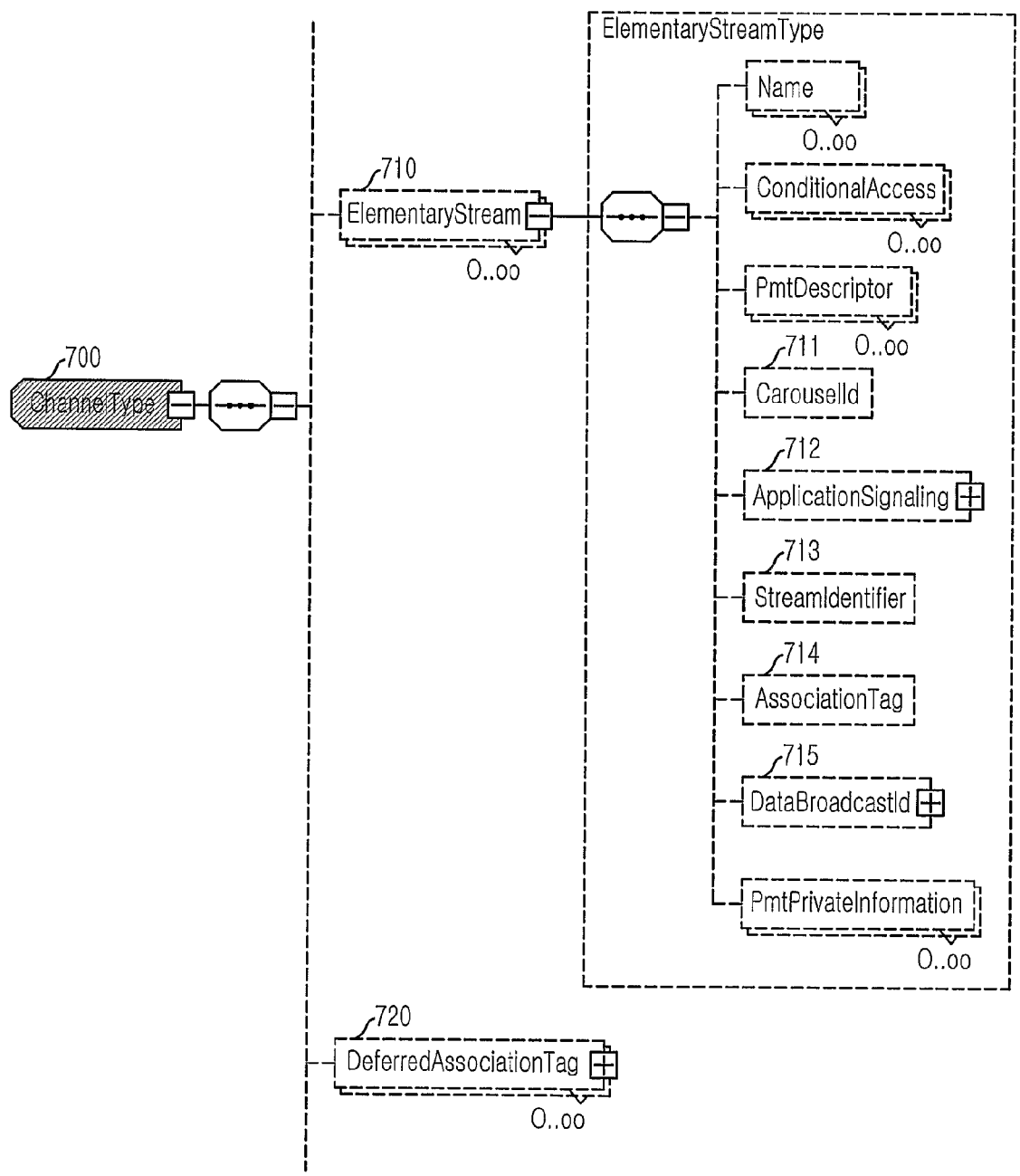
FIG. 7 is a diagram illustrating channel metadata of FIG. 2.

FIG. 7 is a diagram illustrating ChannelType metadata of FIG. 2. The ChannelType metadata 700 further include metadata describing Program Map Table (PMT) descriptor, compared to the conventional channel metadata 130. A PMT provides information on elementary stream of a program and it is used to signalize an application together with an AIT, which is defined in the ACAP.

As shown in FIG. 7, the ChannelType metadata 700 further include DeferredAssociationTag metadata 720 describing a PMT descriptor 'deferred_association_tag descriptor.' Also, the ChannelType metadata 700 additionally include CarouselId metadata 711, ApplicationSignaling metadata 712, StreamIdentifier metadata 713, AssociationTag metadata 714, and DataBroadcastId metadata 715, in an ElementaryStream metadata 710. The metadata 711, 712, 713, 714 and 715 describe information on PMT descriptors 'carousel_identifier descriptor,' 'application signalling descriptor,' 'stream_identifier descriptor,' 'association_tag descriptor,' and 'data_broadcast_id descriptor,' respectively.

Figure 8:
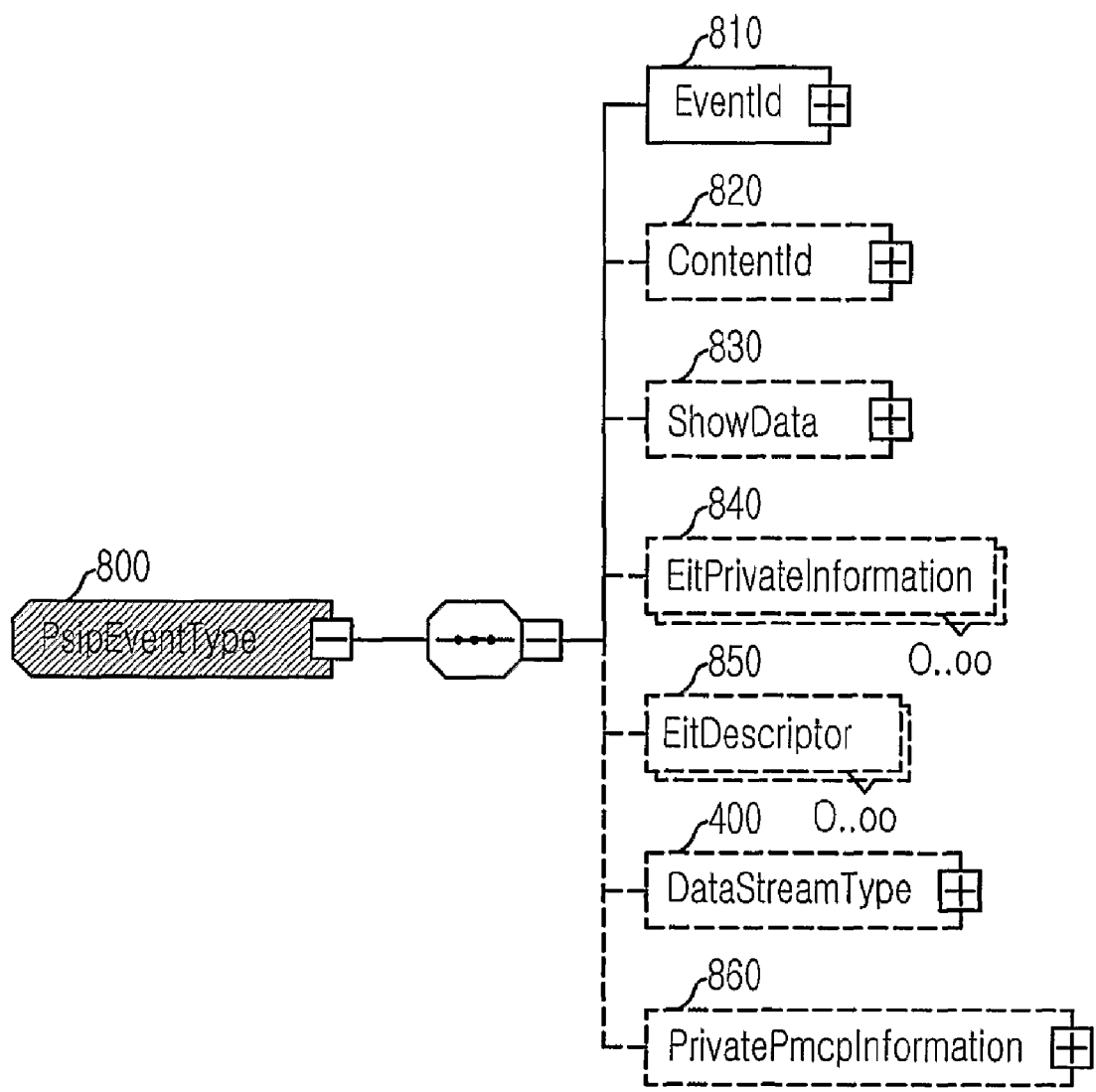
FIG. 8 is a diagram showing PSIP event metadata of PmcpMessage metadata in accordance with a second embodiment of the present invention.

Meanwhile, as PmcpMessage metadata in accordance with a second embodiment of the present invention, the DataStreamType metadata 400 having the structure of FIG. 4 metadata can be defined through extension of conventional PsipEvent metadata 150. FIG. 8 is a diagram showing PSIP event metadata having a DataStreamType metadata in accordance with a second embodiment of the present invention.

The DataStreamType metadata 400 can be formed to be included in a PsipEventType metadata 800, when a data event and broadcast program guide of an AV event are the same. In this case, the PsipEventType metadata 300 as shown in FIG. 2 is not needed.

The PsipEventType metadata 800 include EventId metadata 810, ContentId metadata 820, ShowData metadata 830, EitPrivateInformation 840, EitDescriptor metadata 850, DataStreamType metadata 400, and PrivatePmcpInformation metadata 860.

The EventId metadata 810 describe identification information of an AV event constituting an AV broadcast program, include a Transport Stream Identifier (TSID) in addition to a channel number corresponding to the AV event, and further include any one selected among an event ID, initial start time, ID information arbitrary assigned by a producer.

The ContentId metadata 820 describe identification information constituting an AV event and include an International Standard Audiovisual Number (ISAN) identification information inherently assigned by a broadcasting station to a content.

The ShowData metadata 830 describe show information constituting an AV event and include the title of a show, an overview of a show, and the rating of a show.

The EitPrivateInformation 840 is used to individually define what needs to be registered other than a predetermined schema in connection with an Event Information Table (EIT).

The EitDescriptor metadata 850 describe descriptor information of an EIT and include a descriptor tag number and contents of a descriptor.

The DataStreamType metadata 400 describe encapsulation information of a data event constituting a data broadcast program and include signaling information of a data service and transport protocol information.

The PrivatePmcpInformation metadata 860 describe private information defined by a user with respect to an event constituting an AV broadcast program.

As PmcpMessage metadata in accordance with a third embodiment of the present invention, the DataStreamType metadata can be formed not to be included in PsipDataEvent metadata but to be included in PmcpMessage metadata along with PsipDataEvent metadata on equal terms.

Figure 9:
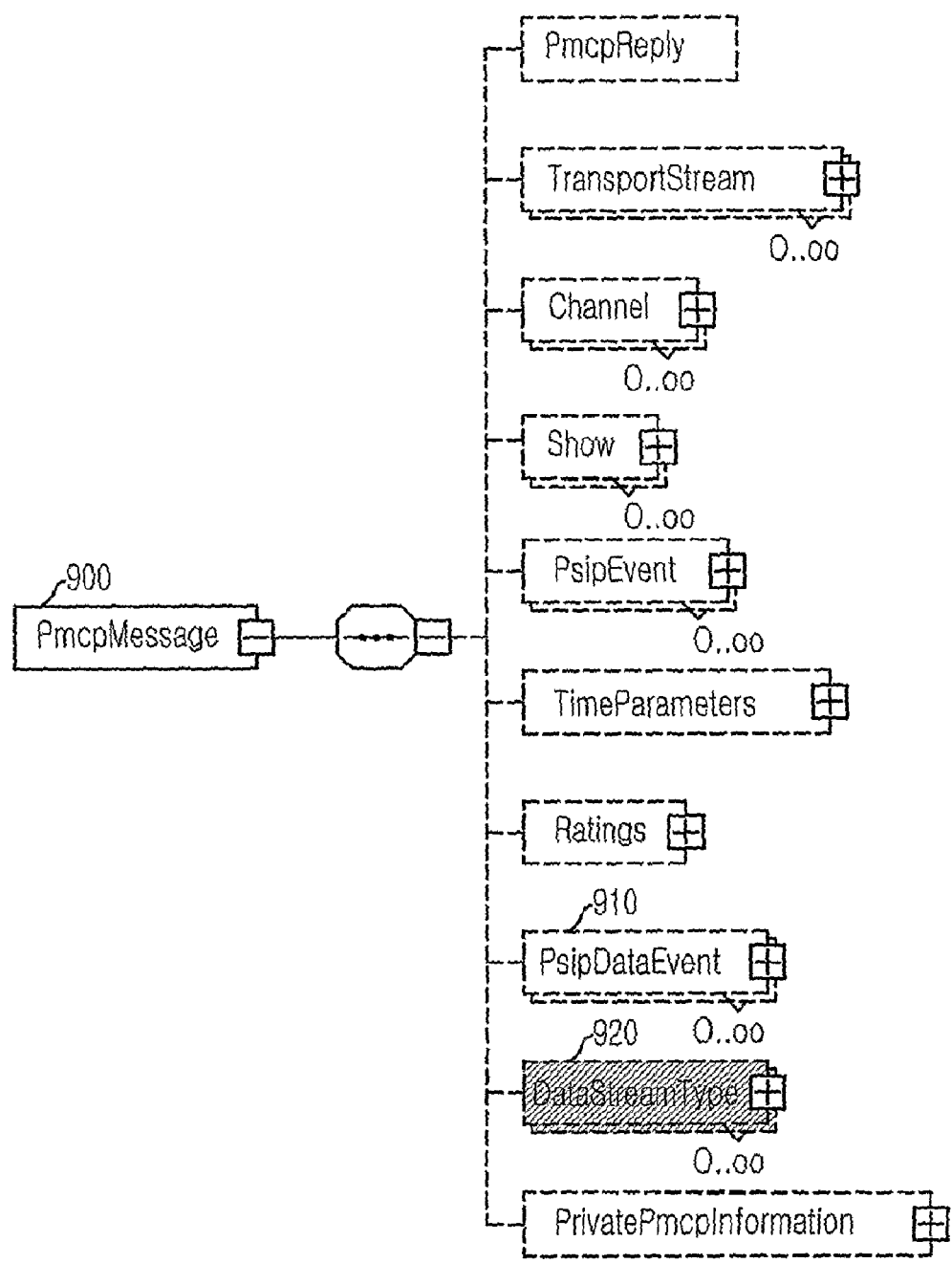
FIG. 9 is a diagram describing PmcpMessage metadata in accordance with a third embodiment of the present invention.
Figure 10:
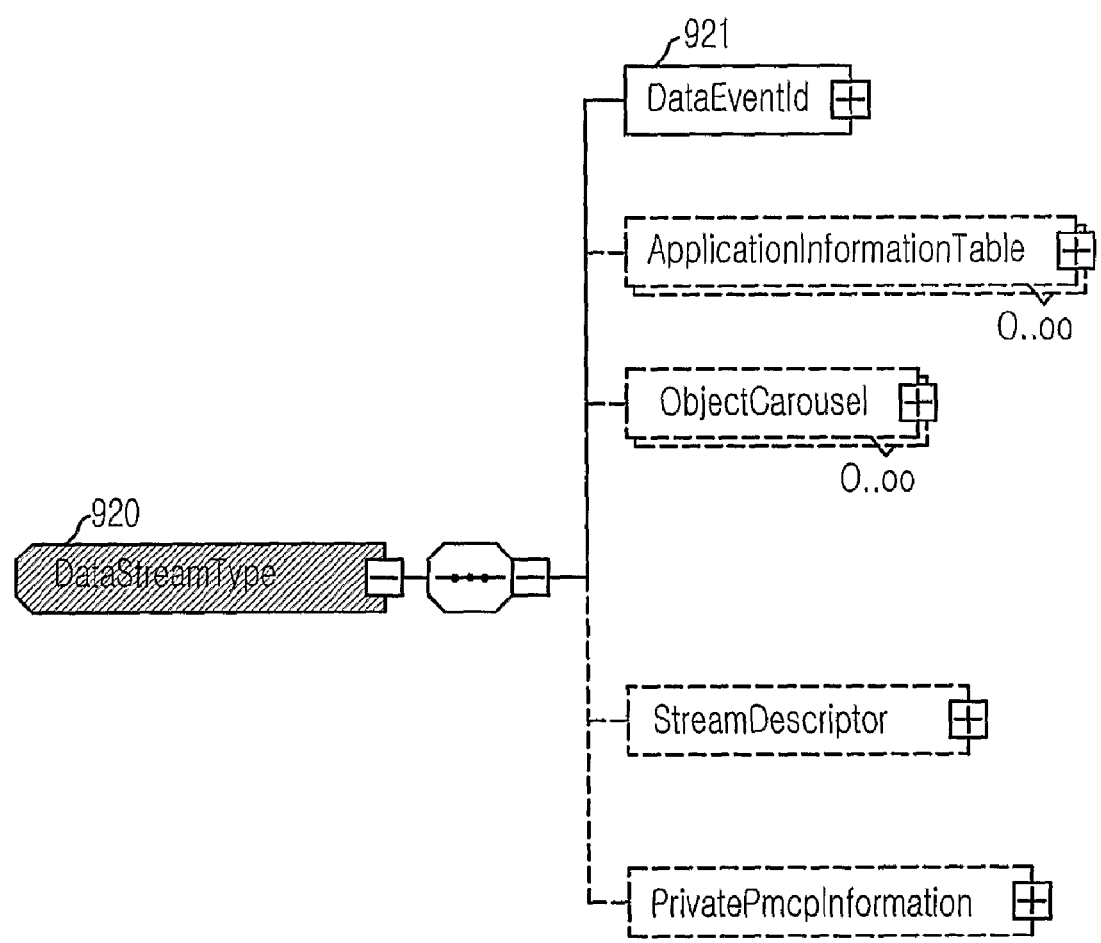
FIG. 10 is a diagram showing DataStreamType metadata of FIG. 9.

FIG. 9 is a diagram describing PmcpMessage metadata in accordance with a third embodiment of the present invention. The PmcpMessage 900 of FIG. 9, which are PmcpMessage metadata, take the DataStreamType metadata out of the PsipDataEvent metadata 300 and include PsipDataEvent metadata 910 and DataStreamType metadata 920 in the PmcpMessage metadata 900, compared to the PmcpMessage metadata 200 of FIG. 2. In this case, the DataStreamType metadata 920 include program guide as attributes and include DataEventId metadata 921 to identify a data event therein.

FIG. 11 is an exemplary schema of a PMCP extended message realized by using PmcpMessage metadata in accordance with a first embodiment of the present invention. As known from the attributes of the PmcpMessage metadata, a system transmitting a present message is a traffic system and a system receiving the present message is an ACAP data server.

As known from a 'Channel' element, the channel number is 11-1 and TSID is 101. Also, the PID of ACAP data elementary stream is 210, and the PID of AIT elementary stream is 220, while the PID of video elementary stream is 48 and the PID of audio elementary stream is 49.

According to the attributes of a PsipDataEvent element, start time, which is program guide information of a data broadcasting, is defined to be 2004-12-14T04:30:00+09:00 and broadcasting duration is defined to be PT50M.

Figure 12:
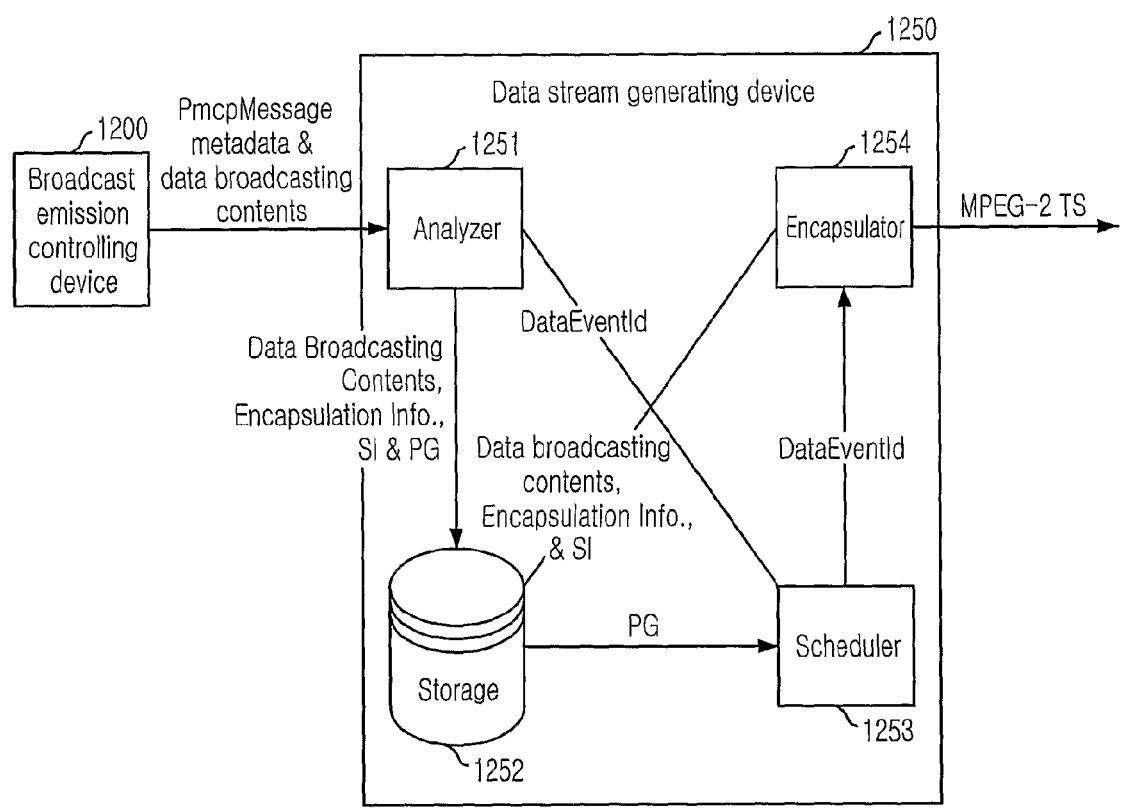
FIG. 12 is a block diagram showing a digital data broadcast emitting system using PmcpMessage metadata in accordance with an embodiment of the present invention.

FIG. 12 is a block diagram showing a digital data broadcast emitting system using PmcpMessage metadata in accordance with an embodiment of the present invention. The broadcast emitting system using PmcpMessage metadata is formed of a broadcast emission controlling device 1200 and a data stream generating device 1250.

The broadcast emission controlling device 1200 generates encapsulation information and program guide of a data broadcast program by using the PmcpMessage metadata structure, which is suggested in the present invention, and controls the output of transport stream of the data broadcast program according to the program guide.

The broadcast emission controlling device 1200 includes a program management system, a traffic system, an automation system, a metadata extractor, a data encapsulation information editor, an MPEG controller, a file server for storing and managing data broadcasting contents, and a data agent transmitting updated data to a database.

The broadcast emission controlling device 1200 can update the program guide and/or the data broadcasting contents by using the PmcpMessage metadata before transmission of transport stream. In this case, the broadcast emission controlling device 1200 updates data and informs the data stream generating device 1250 of the update information by using the PmcpMessage metadata.

The data stream generating device 1250, i.e., a data server, generates and transmits data stream according to the program guide, system information and encapsulation information which are described in the PmcpMessage metadata.

The data server can generate not only data stream including AIT, object carousel and stream descriptor but also a PSIP table in the form of transport stream. The data server generates the AIT based on AIT metadata 500 describing signaling information, encapsulates data based on ObjectCarouselType metadata 600 describing information on object carousel which is a protocol for transmitting an ACAP application, and generates a stream descriptor based on StreamDescriptor metadata 410 describing information on a DSM-CC stream descriptor.

The data stream generating device 1250 includes an analyzer 1251, a storage 1252, a scheduler 1253, and an encapsulator 1254.

The analyzer 1251 receives the PmcpMessage metadata and data broadcasting contents from the broadcast emission controlling device 1200. The analyzer 1251 analyzes the received PmcpMessage metadata and registers system information, program guide and encapsulation information in the storage 1252 together with the data broadcasting contents.

In the first embodiment shown in FIG. 2, the analyzer 1251 can acquire program guide from the attributes of PsipDataEvent metadata 300. Also, in the second embodiment shown in FIG. 8, the analyzer 1251 can acquire program guide from the attributes of PsipEventType metadata 800. Also, in the third embodiment shown in FIG. 9, the analyzer 1251 can acquire program guide from the attributes of DataStreamType metadata 920.

In the first and third embodiments shown in FIGS. 2 and 9, the analyzer 1251 can acquire system information from corresponding ChannelType metadata 700. In the second embodiment shown in FIG. 8, the analyzer 1251 can acquire system information from corresponding ChannelType metadata by using the AV event ID of EventId metadata 810.

In the first to third embodiments shown in FIGS. 2, 8 and 9, the analyzer 1251 can acquire encapsulation information from the DataStreamType metadata 400 and 920.

The analyzer 1251 transmits program guide retrieval information to the scheduler 1253. As for the program guide retrieval information, a data event ID for identifying PmcpMessage metadata is used. As shown in FIG. 8, when a data event and broadcast program guide of an AV event are the same, an event ID is used as program guide because there is no data event ID. The analyzer 1251 can provide data event IDs for more than one data events to be broadcasted during a predetermined time duration to the scheduler 1253.

The scheduler 1253 acquire program guide for data events from the storage 1252 upon receipt of the data event ID transmitted from the analyzer 1251.

The scheduler 1253 checks out time when a data broadcasting content corresponding to a data event is supposed to be outputted in the form of transport stream based on the acquired program guide.

When a certain data event reaches its time to be outputted, the scheduler 1253 transmits data broadcasting content retrieval information, i.e., a data event ID, to the encapsulator 1254 in order to examine the data broadcasting content corresponding to the data event. When the data event and broadcast program guide of an AV event are the same as shown in FIG. 8, the event ID is used as the data broadcasting content retrieval information because there is no data event ID.

The encapsulator 1254 acquires corresponding data broadcasting contents, encapsulation information, and system information from the storage 1252 by using the data event ID or event ID transmitted from the scheduler 1253. The encapsulator 1254 generates transport stream for the acquired data broadcasting contents, encapsulation information and system information and outputs the transport stream to a user terminal.

FIG. 13 is a flowchart describing a data broadcast emitting method using PmcpMessage metadata in accordance with an embodiment of the present invention.

At step S1301, the broadcast emission controlling device 1200 generates PmcpMessage metadata by generating encapsulation information and schedule information for a data event for data broadcasting and adding the encapsulation information and schedule information to conventional PmcpMessage metadata 100. At step S1303, it transmits the generated PmcpMessage metadata and data broadcasting contents to an analyzer 1251 of a data stream generating device 1250.

Also, when data broadcast program guide or a data broadcasting content is added, deleted or updated, at the step S1301, the broadcast emission controlling device 1200 updates the generated PmcpMessage metadata and, at the step S1303, transmits the updated PmcpMessage metadata to the analyzer 1251 of the broadcast emission controlling device 1200.

At step S1305, the analyzer 1251 analyzes the PmcpMessage metadata and, at step S1307, registers program guide, system information, encapsulation information and data broadcasting content in a storage 1252.

At step S1309, the analyzer 1251 transmits program guide retrieval information, which is a data event ID or an event ID, to a scheduler 1253.

At steps S1311 and S1313, the scheduler 1253 retrieves and acquires program guide for the data event among data registered in the storage 1252 based on the program guide retrieval information.

The scheduler 1253 controls a data encapsulator 1254 to transmit a data broadcasting content corresponding to the data event based on the data event program guide transmitted form the storage 1252. To be more specific, at step S1315, when the scheduler 1253 examines schedule and figure out that it is time to transmit a specific data event, at step s1317, transmits data broadcasting content retrieval information, i.e., a data event ID corresponding to the data event.

At steps S1319 and S1321, the encapsulator 1254 retrieves and acquires a corresponding data broadcasting content, system information and encapsulation information based on the transmitted data event ID. At step S1323, the encapsulator 1254 generates transport stream for the acquired data broadcasting content, system information and encapsulation information and outputs them to the user terminal. When it is time to terminate the data event, the scheduler 1253 controls the encapsulator 1254 to stop transmitting the transport stream.

The method of the present invention, which is described above, can be stored in a computer-readable recording medium, such as CD-ROM RAM, ROM, floppy disks, hard disks, magneto-optical disks and the like.

While the present invention has been described with respect to certain preferred embodiments, it will be apparent to those skilled in the art that various changes and modifications may be made without departing from the scope of the invention as defined in the following claims.

INDUSTRIAL APPLICABILITY

The technology of the present invention can be applied to digital data broadcast emitting systems.

What is claimed is:

1. A method for generating data stream, comprising the steps of:
   generating an extended metadata, wherein the extended metadata comprises a data event metadata comprising program guide information of data events constituting a data broadcasting and a data stream metadata comprising encoding information and signaling information for the data broadcasting;
   acquiring the program guide information, the encoding information and the signaling information from the extended metadata;
   generating the data stream by encoding data broadcasting contents which fits to the program guide of the data events according to the encoding information and the signaling information;
   wherein the encoding information comprises a data carousel including a Download Server Initiate (DSI) message and a Download Info Indication (DII) and an object carousel including a service gateway message, a directory message, a file message, a stream message and a stream event message; and
   wherein the signaling information comprises Application Information Table (AIT) signaling information including location information of the Download Info Indication (DII).

2. The method as recited in claim 1, wherein the data event metadata is defined in a program and system information protocol (PSIP),
   and the program guide information is updated according to a change of contents of the data broadcasting.

3. The method as recited in claim 2, wherein the program guide information comprises event identification information of the data events, content identification information of the data events and Data Event Table (DET) information.

4. The method as recited in claim 3, wherein the data stream metadata is defined in an advanced common application platform (ACAP), and
   the data carousel further includes a Packet Identifier (PID), and
   the Application Information Table (AIT) signaling information further includes detailed information for an application, information for describing a transmit protocol of the application and Application Information Table (AIT) information.

5. The method as recited in claim 1, wherein the extended metadata is defined in a program metadata communication protocol (PMCP), and
   the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

6. The method as recited in claim 1, wherein the encoding information comprises information for encapsulation.

7. A system for digital data broadcasting, comprising:
a broadcasting controlling device for generating an extended metadata, wherein the extended metadata comprises a data event metadata comprising program guide information of data events constituting a data broadcasting and a data stream metadata comprising encoding information and signaling information for the data broadcasting;
a transmit stream generating unit for acquiring the program guide information, the encoding information and the signaling information from the extended metadata and generating a data stream by encoding data broadcasting contents which fits to the program guide of the data events according to the encoding information and the signaling information;
wherein the encoding information comprises a data carousel including a Download Server Initiate (DSI) message and a Download Info Indication (DII) and an object carousel including a service gateway message, a directory message, a file message, a stream message and a stream event message; and
wherein the signaling information comprises Application Information Table (AIT) signaling information including location information of the Download Info Indication (DII).

8. The system as recited in claim 7, wherein the data event metadata is defined in a program and system information protocol (PSIP),
and the program guide information is updated according to a change of contents of the data broadcasting.

9. The system as recited in claim 8, wherein the program guide information comprises event identification information of the data events, content identification information of the data events and Data Event Table (DET) information.

10. The method as recited in claim 7, wherein the data stream metadata is defined in an advanced common application platform (ACAP), and
the data carousel further includes a Packet Identifier (PID), and
the Application Information Table (AIT) signaling information further includes detailed information for an application, information for describing a transmit protocol of the application and Application Information Table (AIT) information.

11. The system as recited in claim 7, wherein the extended metadata is defined in a program metadata communication protocol (PMCP), and
the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

12. The system as recited in claim 7, wherein the encoding information comprises information for encapsulation.

13. A method for receiving data stream, comprising the steps of:
receiving the data stream generated by encoding data broadcasting contents which fits to a program guide of data events according to encoding information and signaling information from an extended metadata, wherein the extended metadata comprises a data event metadata comprising the program guide information of the data events constituting the data broadcasting and a data stream metadata comprising the encoding information and the signaling information for the data broadcasting, wherein the program guide information comprises event identification information of the data events, content identification information of the data events and Data Event Table (DET) information;
decoding the data stream;
wherein the encoding information comprises a data carousel including a Download Server Initiate (DSI) message and a Download Info Indication (DII) and an object carousel including a service gateway message, a directory message, a file message, a stream message and a stream event message; and
wherein the signaling information comprises Application Information Table (AIT) signaling information including location information of the Download Info Indication (DII).

14. The method as recited in claim 13, wherein the data event metadata is defined in a program and system information protocol (PSIP),
and the program guide information is updated according to a change of contents of the data broadcasting.

15. The method as recited in claim 13, wherein the data stream metadata is defined in an advanced common application platform (ACAP), and
the data carousel further includes a Packet Identifier (PID), and
the Application Information Table (AIT) signaling information further includes detailed information for an application, information for describing a transmit protocol of the application and Application Information Table (AIT) information.

16. The method as recited in claim 13, wherein the extended metadata is defined in a program metadata communication protocol (PMCP), and
the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

17. The method as recited in claim 13, wherein the encoding information comprises information for encapsulation.

18. An apparatus for receiving data stream, comprising:
a receiving unit for receiving the data stream generated by encoding data broadcasting contents which fits to a program guide of data events according to encoding information and signaling information from an extended metadata, wherein the extended metadata comprises a data event metadata comprising the program guide information of the data events constituting the data broadcasting and a data stream metadata comprising the encoding information and the signaling information for the data broadcasting, wherein the program guide information comprises event identification information of the data events, content identification information of the data events and Data Event Table (DET) information;
a decoding unit for decoding the data stream;
wherein the encoding information comprises a data carousel including a Download Server Initiate (DSI) message and a Download Info Indication (DII) and an object carousel including a service gateway message, a directory message, a file message, a stream message and a stream event message; and wherein the signaling information comprises Application Information Table (AIT) signaling information including location information of the Download Info Indication (DII).

19. The apparatus as recited in claim 18, wherein the data event metadata is defined in a program and system information protocol (PSIP), and the program guide information is updated according to a change of contents of the data broadcasting.

20. The method as recited in claim 18, wherein the data stream metadata is defined in an advanced common application platform (ACAP), and the data carousel further includes a Packet Identifier (PID), and the Application Information Table (AIT) signaling information further includes detailed information for an application, information for describing a transmit protocol of the application and Application Information Table (AIT) information.

21. The apparatus as recited in claim 18, wherein the extended metadata is defined in a program metadata communication protocol (PMCP), and the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

22. The apparatus as recited in claim 18, wherein the encoding information comprises information for encapsulation.

* * * * *